United States Patent [19]

Durbin, Jr. et al.

[11] 3,821,789

[45] June 28, 1974

[54] CHROMA TRACKING CIRCUIT

[75] Inventors: Jesse Durbin, Jr.; John Ralph D'Aiuto, both of Fort Wayne, Ind.

[73] Assignee: The Magnavox Company, Fort Wayne, Ind.

[22] Filed: Nov. 6, 1972

[21] Appl. No.: 304,281

[52] U.S. Cl. .................... 358/27, 358/29, 358/39

[51] Int. Cl. .......................... H04n 9/04, H04n 9/48

[58] Field of Search ....... 178/5.4 R, 5.4 BT, 5.4 ST, 178/5.4 AC

[56] References Cited

UNITED STATES PATENTS

| | | | |
|---|---|---|---|
| 2,969,424 | 1/1961 | Tait | 178/5.4 TC |
| 3,107,275 | 10/1963 | Chatten | 178/5.4 AC |
| 3,627,911 | 12/1971 | Kubota et al. | 178/5.4 AC |
| 3,699,241 | 10/1972 | Larsen | 178/5.4 ST |

*Primary Examiner*—Robert L. Richardson
*Attorney, Agent, or Firm*—T. A. Briody; W. W. Holloway; R. T. Seeger

[57] ABSTRACT

A feedback circuit to prevent loss of relative color saturation at increased illumination levels in a one tube color camera television system is disclosed comprising means for sensing variations in the absolute magnitude of the luminance signal, and means responsive thereto for varying the gain imparted to the luminance signal or to the chrominance signal relative to the other signal. In one preferred embodiment the variable gain is achieved by providing a variable impedance comprising first and second parallel branches, the first of which presents a relatively low impedance to the chrominance signal frequency range and a relatively high impedance to the luminance signal frequency range and the other of which has an impedance which is substantially frequency independent and is intermediate the relatively low and relatively high impedances characteristic of the first branch. A shunt means in the form of a field effect transistor is in parallel with these branches and is gated by a control signal indicative of the luminance signal magnitude so that when the field effect transistor conducts, the over-all impedance of the parallel combination decreases more rapidly for signals in the luminance signal frequency range than for signals in the chrominance signal frequency range thereby varying the relative gain of the luminance signals to the chrominance signals.

16 Claims, 1 Drawing Figure

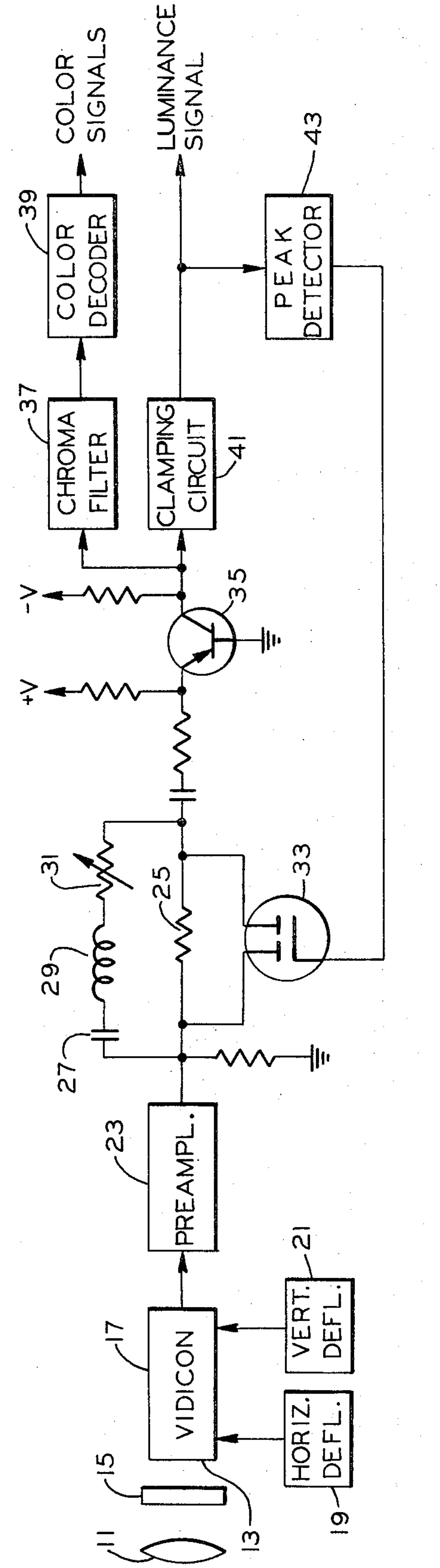
COLOR SIGNALS
LUMINANCE SIGNAL
COLOR DECODER
PEAK DETECTOR
CHROMA FILTER
CLAMPING CIRCUIT
-V
+V
PREAMPL.
VIDICON
VERT. DEFL.
HORIZ. DEFL.
11
13
15
17
19
21
23
25
27
29
31
33
35
37
39
41
43

CHROMA TRACKING CIRCUIT

BACKGROUND OF THE INVENTION

The present invention relates to color camera television systems and more particularly to such systems employing but a single tube for generating both luminance and chrominance signals. Such one tube color television cameras are well-known in the art and are, for example, illustrated in U.S. Pat. Nos. 3,378,633; 3,502,799; 3,619,489; and 3,619,490 as well as copending applications Ser. No. 239,038 entitled "Automatic Focus Control for Image Pickup Devices" filed Mar. 29, 1972 in the name of Kenneth R. Skinner and Ser. No. 831,029 entitled "Transducer System and Method" filed June 6, 1969 in the names of Alfred M. Nelson and Daniel J. Marshall and issued in the name of Daniel J. Marshall, U.S. Pat. No. 3,647,943, the copending applications being assigned to the assignee of the present invention.

Taking a Vidicon as illustrative of one tube which may be used as a single tube color television camera, a normal Vidicon may be provided with one or more color encoding filters generally of the multiple layer interference type designed to pass certain wave lengths of light and to block others. Such multiple layer interference filters are often referred to as dichroic filters. In one scheme for using an image pickup device such as a Vidicon to obtain both luminance and chrominance signals, such a dichroic filter is provided having a set of stripes of dichroic material separated by equal sized transparent stripes. The stripes are so oriented with respect to the direction of scan of the image pickup device as to produce an amplitude modulated color carrier electrical output signal at a desired frequency. Two sets of stripes of dichroic material having dissimilar light passing characteristics may be employed to provide either two color carrier frequencies or a single color carrier frequency with phase encoding of the color information. The light passing through the filter is incident on the light sensitive target or conversion layer of a Vidicon or other image pickup device where it is transformed into video signals for recording or transmission.

It has been found that the ratio of the magnitudes of the chrominance to luminance signals obtained from such a one tube color system does not remain constant as the magnitude of the light intensity incident on the filter varies but rather as the face plate illumination increases there is an undesirable relative decrease in saturation of the colors in a displayed output.

Accordingly it is one object of the present invention to maintain a better balance between color and intensity under varying lighting conditions in a color T.V. system.

Another object of the present invention is to diminish variations in relative color saturation due to variations in illumination level in a one tube color camera television system.

A further object of the present invention is to prevent loss of color saturation at increased illumination levels in a one tube color camera television system.

A still further object of the present invention is to balance the ratio of chrominance signals to luminance signals from a color television camera.

A general object of the present invention is to provide an improved color image pickup system.

SUMMARY OF THE INVENTION

The foregoing as well as numerous other objects and advantages of the present invention are achieved by providing a sort of luminance automatic gain control circuit which detects the level of face plate illumination and maintains the luminance signal output at a relatively constant level. This automatic gain control circuit is bypassed by a high pass filter which prevents the automatic gain control function from having any substantial effect on the encoded chrominance information.

Accordingly still another object of the present invention is to provide a circuit which functions as an automatic gain control circuit for signals in one frequency range and yet has no substantial effect on signals in another frequency range.

Yet another object of the present invention is to provide a one tube color camera television system having a feedback control signal which varies the gain imparted to the luminance signal relative to that imparted to the chrominance signal.

BRIEF DESCRIPTION OF THE DRAWING

The aforementioned and other objects, features and advantages of the present invention will become more apparent from the following detailed description thereof when considered in conjunction with the drawing wherein the sole FIGURE is a schematic diagram partially in block functional form illustrating a one tube color camera television system beginning with the image pickup device focusing lens and ending with separated luminance and chrominance signal outputs.

DESCRIPTION OF THE PREFERRED EMBODIMENT

Considering now the drawing, light from a scene to be televised in color passes through a focusing lens 11 so as to be focused on a photosensitive conversion layer 13 such as that found in a Vidicon. Immediately in front of that photosensitive conversion layer is a color encoding filter 15, for example, of the type employed in the aforementioned copending applications. The image pickup device 17 receives horizontal and vertical deflection signals from the generators 19 and 21 in well-known fashion so as to repetitively scan the photosensitive conversion layer and provide output signals to a preamplifier 23. The information received and amplified by the preamplifier 23, of course, depends upon the particular type of color image pickup device employed. In an exemplary system such as disclosed in the aforementioned copending applications where a Vidicon face plate is provided with a series of dichroic red suppressing stripes and a second series of blue suppressing dichroic stripes each skewed relative to the first set of stripes the manifestation of color information will depend upon the stripe width, separation, scan rate of the Vidicon, and the angle at which the stripes lie relative to the scanning direction. In such a system, two pieces of color information are provided, both of which may be phase encoded on the same color carrier or which may appear on separate carriers, but in either event it is desirable that the color carrier lie outside the luminance signal frequency band. In one system constructed in accordance with the teachings of the aforementioned applications a color carrier of 3.58 megacycles having the color information phase encoded thereon was provided with the luminance signal frequency band lying below this 3.58 megacycle figure. Thus the output of the preamplifier 23 has both color and luminance information with the color information being carrier encoded at a frequency lying above the frequency band for the luminance information.

A variable impedance means is coupled to the preamplifier output and includes a first parallel branch which behaves like a filter to pass the color information signals readily but to not pass the luminance information signals readily and a second parallel branch represented by the resistor 25 which passes primarily the luminance information signals. With the exemplary 3.58 megacycle color carrier input the first branch may be simply a series tuned circuit comprising the capacitor 27 and inductor 29 and may, in addition, include a variable resistance 31 which may be used to balance the levels of color and luminance information. The variable impedance means also has a shunt means in parallel with the parallel branches which is illustrated as a field effect transistor 33. The field effect transistor is responsive to control signals applied to its gate to provide a variable impedance shunt across the parallel branches by way of source to drain current flow such that when the source to drain impedance decreases, the over-all impedance of the parallel combination decreases more rapidly for signals in the luminance band than for the color information signals. The impedance of the resistor 25 is in magnitude less than the impedance of the tuned circuit branch to the luminance signals but is greater than the impedance of that tuned circuit branch to the chrominance signals.

The output of the variable impedance means is coupled in standard fashion to an amplifying means which is illustrated as a NPN transistor 35 connected in common or grounded base configuration. Transistor 35 has a low input impedance and forms the shunt element of a variable voltage divider composed of the field effect transistor 33 and the common base input impedance of transistor 35. As the bias on 33 is increased, the source-drain impedance increases causing more luminance signal voltage drop across 33 and less to be dropped at the transistor 35 input. The output of this amplifying means is supplied to a filter 37 which will pass the color information signals and not pass the luminance signals. This filter 37 may be, for example, a high pass filter or in the 3.58 megacycle color carrier example mentioned previously it may be a filter which functions to pass signals only in the neighborhood of 3.58 megacycles. The thus separated color signals emanating from the filter 37 are passed into a color decoder of any desired known configuration for decoding the color signals for transmission or utilization. The luminance signals present at the output of transistor 35 being blocked by the filter 37 are passed through a clamping circuit 41 which may, for example, shift those signals so that their lowermost excursion is clamped to a predetermined value. The luminance signals passing through this clamping circuit may be similarly utilized as desired but additionally are passed through a peak detector 43 which provides a control signal output indicative of the magnitude of the luminance signals. The clamping circuit 41 and peak detector 43 together function as a means for providing a signal indicative of illumination level, and this signal is fed back to the gate of the field effect transistor 33 to vary the impedance of the variable impedance network and thus vary the gain of the circuit between the preamplifier 23 output and the means for separating the color signals from the luminance signals.

In operation, if the light intensity on the photosensitive conversion layer 13 increases so as to normally cause a diminution of relative color saturation in the output signals, the peak detector 43 provides an increased control signal to the gate of the field effect transistor 33 which functions to increase the source to drain impedance of that field effect transistor and thus introduce increased relative impedance to the luminance signal resulting in decreased over-all luminance signal gain and a return to proper balance between color and luminance signals.

Thus while the present invention has been described with respect to a specific embodiment, numerous modifications will suggest themselves to those of ordinary skill in the art, and accordingly the scope of the present invention is to be measured only by that of the appended claims.

What is claimed is:

1. A circuit for balancing the ratio of chrominance signals to luminance signals from a color television camera comprising:

means for sensing variations in the magnitude of the luminance signal; and means responsive to said sensing means for varying the gain imparted to that luminance signal without substantially varying the gain imparted to the chrominance signal.

2. In a color television camera system having an image pickup device for providing a composite output signal including signals in a first frequency range representative of illumination level and signals in a second frequency range representative of color information, the relative phase of the color signals representing hue and the magnitude of the color signals representing saturation, means for separating the second frequency range signals from the composite signal to thereby provide separated color and luminance outputs, and means coupling the composite output signal from the image pickup device to the means for separating; a circuit for compensating for variations in relative saturation with changes in illumination level comprising:

means for sensing the magnitude of output signals in the first frequency range and for providing a control signal indicative thereof; and variable impedance means within said coupling means responsive to said control signal to vary the impedance of said variable impedance means in the first and second frequency ranges by differing amounts, so that the saturation of the color signal is controlled over a substantial portion of the range of luminance signal levels to minimize loss of saturation at increased luminance signal levels and to minimize over saturation at decreased luminance signal levels.

3. The circuit of claim 2 wherein the coupling means further comprises a preamplifier having its input coupled to the image pickup device and its output coupled to the variable impedance means.

4. The circuit of claim 3 wherein the coupling means further comprises amplifier means having a relatively low input impedance and a relatively high output impedance and having its input coupled to the variable impedance means and its output coupled to the means for separating.

5. The circuit of claim 4 wherein the amplifier means comprises a transistor connected in a common base configuration.

6. The circuit of claim 5 wherein the means for separating comprises a high pass filter for passing signals in the second frequency range while effectively blocking signals in the first frequency range.

7. The circuit of claim 6 wherein the variable impedance means comprises first and second parallel branches, said first branch presenting a relatively low impedance to the second frequency range signals and a relatively high impedance to the first frequency range signals, said second branch having a substantially frequency independent impedance intermediate said relatively low and relatively high impedance values.

8. The circuit of claim 7 further comprising shunt means in parallel with said parallel branches and responsive to said control signal to provide a variable impedance shunt across said branches whereby when the impedance of said shunt means decreases the over-all impedance of the parallel combination decreases more rapidly for signals in the first frequency range than for signals in the second frequency range.

9. The circuit of claim 8 wherein said shunt means comprises a field effect transistor having its source coupled to one side of the parallel branches and its drain coupled to the other side of said parallel branches and having its gate coupled to the means for sensing to thereby be controlled by the control signal.

10. The circuit of claim 2 wherein the variable impedance means comprises first and second parallel branches, said first branch presenting a relatively low impedance to the second frequency range signals and a relatively high impedance to the first frequency range signals, said second branch having a substantially frequency independent impedance intermediate said relatively low and relatively high impedance values.

11. The circuit of claim 10 further comprising shunt means in parallel with said parallel branches and responsive to said control signal to provide a variable impedance shunt across said branches whereby when the impedance of said shunt means decreases the over-all impedance of the parallel combination decreases more rapidly for signals in the first frequency range than for signals in the second frequency range.

12. The circuit of claim 11 wherein said shunt means comprises a field effect transistor having its source coupled to one side of the parallel branches and its drain coupled to the other side of said parallel branches and having its gate coupled to the means for sensing to thereby be controlled by the control signal.

13. Apparatus comprising, color signal processing means for providing a composite signal containing both luminance and chrominance information;

means for separating the composite signal into a chrominance channel signal and a luminance channel signal;

means responsive to the magnitude of one of said channel signals for providing a control signal; and means responsive to the control signal for imparting a change in the ratio of the luminance information portion of the composite signal to the chrominance information portion of the composite signal, so that the saturation of the composite signal is controlled over a sufficient portion of the range of luminance signal levels to minimize loss of saturation at relatively high luminance signal levels and to minimize over-saturation at relatively low luminance signal levels.

14. The combination of claim 13 wherein the channel signal to which the magnitude responsive means is responsive is the luminance channel signal.

15. The combination of claim 13 wherein the frequency of the chrominance information portion of the composite signal is greater than the frequency of the luminance information portion of the composite signal, said means for separating comprising a band pass filter adapted to pass chrominance information signals and block luminance information signals.

16. The combination of claim 13 wherein the frequency of the chrominance information portion of the composite signal is different from the frequency of the luminance information portion of the composite signal, the last mentioned responsive means comprising a series tuned circuit having a relatively low impedance for frequencies in the neighborhood of the chrominance information portion of the composite signal and a relatively high impedance for frequencies in the neighborhood of the luminance information portion of the composite signal; and a variable impedance current control device in parallel with said series tuned circuit and responsive to said control signal for selectively shunting the series tuned circuit.

* * * * *